United States Patent [19]

Schaetzer

[11] Patent Number: 5,234,467
[45] Date of Patent: Aug. 10, 1993

[54] AZO DYE MIXTURES AND THEIR USE FOR DYEING NATURAL AND SYNTHETIC POLYAMIDE FIBERS

[75] Inventor: Jürgen Schaetzer, Rheinfelden, Fed. Rep. of Germany

[73] Assignee: Ciba-Geigy Corporation, Ardsley, N.Y.

[21] Appl. No.: 914,156

[22] Filed: Jul. 14, 1992

[30] Foreign Application Priority Data

Jul. 19, 1991 [CH] Switzerland .......................... 2162/91

[51] Int. Cl.⁵ ...................... C09B 49/00; C09B 29/40; C09B 67/22; D06P 3/24
[52] U.S. Cl. ............................................. 8/641; 8/639; 8/681; 8/682; 8/683; 8/684; 8/687; 8/690; 8/692; 8/917; 8/924
[58] Field of Search ............................................. 8/641

[56] References Cited

U.S. PATENT DOCUMENTS

| | | | |
|---|---|---|---|
| 3,900,460 | 8/1975 | Dehwert | 534/642 |
| 4,579,561 | 4/1986 | Rowe et al. | 8/641 |
| 4,749,784 | 6/1988 | Feeman | 534/728 |
| 4,789,784 | 6/1988 | Feeman et al. | 8/641 |
| 5,090,964 | 2/1992 | Mausezahl | 8/641 |
| 5,092,905 | 3/1992 | Dore | 8/638 |
| 5,092,906 | 3/1992 | Mausezahl | 8/641 |
| 5,094,665 | 3/1992 | Mausezahl | 8/641 |
| 5,096,460 | 3/1992 | Mausezahl | 8/641 |

FOREIGN PATENT DOCUMENTS

2024265 1/1980 United Kingdom .

*Primary Examiner*—A. Lionel Clingman
*Attorney, Agent, or Firm*—Marla J. Mathias

[57] ABSTRACT

The invention relates to a dye mixture comprising at least one dye of the formula

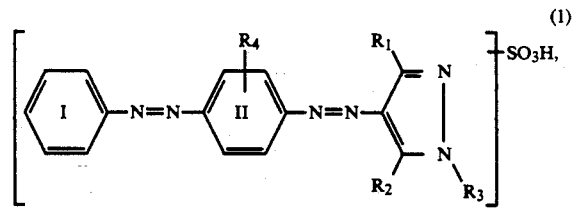

in which $R_1$ and $R_2$, independently of one another, are hydrogen or substituted or unsubstituted $C_1$–$C_8$alkyl or phenyl, $R_3$ is hydrogen or substituted or unsubstituted $C_1$–$C_8$alkyl, $C_5$–$C_7$cycloalkyl or phenyl, $R_4$ is hydrogen or a radical of the formula $$-O-CH_2-\underset{\underset{R_5}{|}}{C}H-OH,$$

$R_5$ is hydrogen or substituted or unsubstituted $C_1$–$C_8$alkyl or phenyl, and benzene rings I and II may be further substituted, together with at least one dye of the formulae (2) to (6) given in the description.

The dye mixtures are suitable for the dyeing or printing of natural and synthetic polyamide fibre materials, in particular in combination with other dyes.

14 Claims, No Drawings

AZO DYE MIXTURES AND THEIR USE FOR DYEING NATURAL AND SYNTHETIC POLYAMIDE FIBERS

The present invention relates to mixtures of yellow- or orange-dyeing dyes which are suitable for the dyeing of natural or synthetic textile polyamide fibre materials from an aqueous bath, have very good fastness properties and, in particular in combination with other dyes, show good affinity, in particular from short liquors.

The present invention relates to a dye mixture comprising at least one dye of the formula

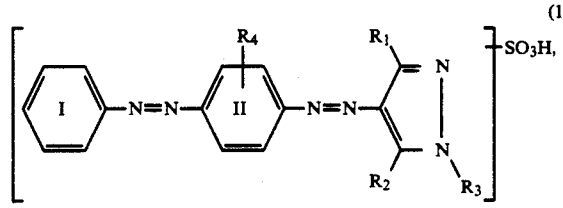

in which $R_1$ and $R_2$, independently of one another, are hydrogen or substituted or unsubstituted $C_1-C_8$alkyl or phenyl, $R_3$ is hydrogen or substituted or unsubstituted $C_1-C_8$alkyl, $C_5-C_7$cycloalkyl or phenyl, $R_4$ is hydrogen or a radical of the formula

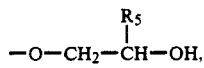

$R_5$ is hydrogen or substituted or unsubstituted $C_1-C_8$alkyl or phenyl, and benzene rings I and II may be further substituted, together with at least one dye of the formulae (2) to (6):

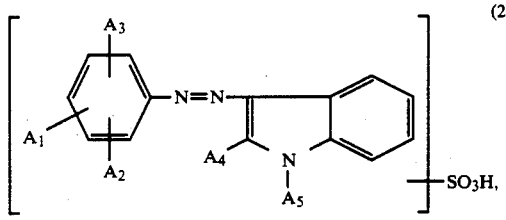

in which $A_1$ and $A_2$ are hydrogen, halogen, $C_1$-4alkoxy, $C_2$-4alkanoylamino or substituted or unsubstituted $C_1$-4alkyl, $A_3$ is substituted or unsubstituted phenylsulfonyl, naphthylsulfonyl or $C_1$-4alkylaminosulfonyl, $A_4$ is hydrogen, substituted or unsubstituted $C_1-C_4$alkyl, phenyl or naphthyl and $A_5$ is hydrogen or $C_1-C_8$alkyl,

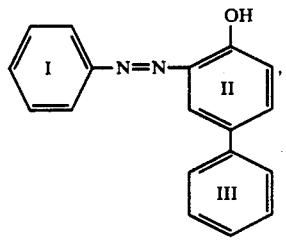

in which benzene rings I, II and III are substituted or unsubstituted,

in which benzene rings IV, V and VI are substituted or unsubstituted and $B_1$ is hydrogen or substituted or unsubstituted phenyl- or naphthylsulfonyl,

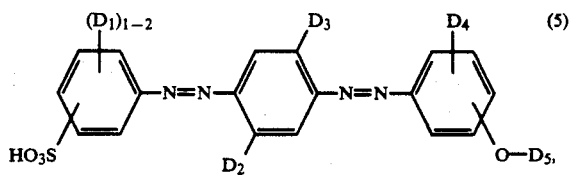

in which $D_1$, $D_2$ and $D_3$ are hydrogen, $C_1$-4alkyl, $C_1$-4alkoxy, $C_2$-4hydroxyalkoxy, $C_2-C_4$alkanoylamino or carbamoyl and $D_4$ and $D_5$ are hydrogen, $C_1$-4alkyl or $C_2$-4hydroxyalkyl and $(D_1)_{1-2}$ is one or two substituents $D_1$, and

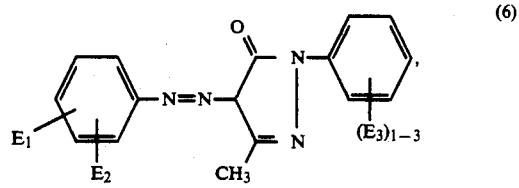

in which $E_1$ is hydrogen, $C_1$-4alkyl, $C_1$-4alkoxy, $C_2$-4alkanoylamino, sulfo or halogen, $E_2$ is hydrogen, halogen, sulfo or substituted or unsubstituted phenyl- or naphthylaminosulfonyl and $(E_3)_{1-3}$ is 1 to 3 substituents $E_3$ and $E_3$ is hydrogen, halogen, $C_1$-4alkyl, $C_1$-4alkoxy or sulfo.

The azo dyes of the formula (1) in which $R_1$ and $R_2$ are different from one another and in addition $R_3$ is not hydrogen are, as a rule, present as a mixture of isomers of the compounds of the formulae

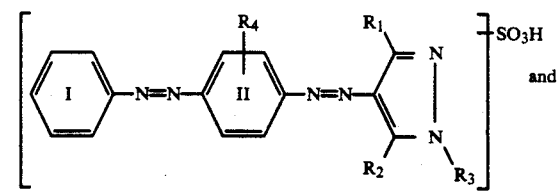

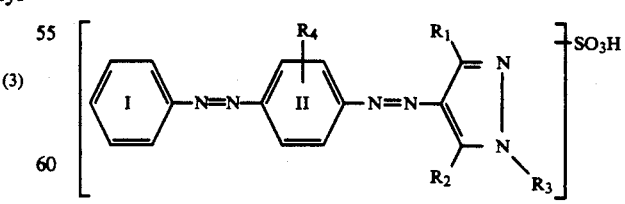

Here and hereinafter, azo dye of the formula (1) is also understood to mean the abovementioned mixtures of isomers.

Examples of $R_1$, $R_2$, $R_3$ and $R_5$ in formula (1) as $C_1-C_8$alkyl are, independently of one another, methyl, ethyl, propyl, isopropyl, butyl, isobutyl, sec-butyl, tert-butyl, pentyl, hexyl, heptyl or octyl, and the corresponding radicals which are substituted, for example, by hydroxyl, $C_1-C_4$alkoxy or halogen. $R_5$ as substituted $C_1-C_8$alkyl is in particular hydroxyl-substituted $C_1-C_8$alkyl.

Examples of $R_3$ in formula (1) as $C_5-C_7$cycloalkyl are unsubstituted cyclohexyl or cyclohexyl which is substituted by $C_1-C_4$alkyl, for example methyl or ethyl.

Examples of $R_1$, $R_2$, $R_3$ and $R_5$ in formula (1) as phenyl are unsubstituted phenyl or phenyl which is substituted by $C_1-C_4$alkyl, for example methyl or ethyl, $C_1-C_4$alkoxy, for example methoxy or ethoxy, $C_2-C_4$alkanoylamino, for example acetylamino or propionylamino, hydroxyl, sulfo or halogen, for example fluorine, chlorine or bromine.

Examples of substituents of benzene rings I and II of the azo dyes of the formula (1) are, independently of one another, $C_1-C_4$alkyl, for example methyl or ethyl, $C_1-C_4$alkoxy, for example methoxy or ethoxy, $C_2-C_4$alkanoylamino, for example acetylamino or propionylamino, hydroxyl, sulfo, nitro, halogen, for example fluorine, chlorine or bromine, sulfamoyl or sulfamoyl which is mono- or disubstituted on the nitrogen atom by $C_1-C_4$alkyl, phenyl or naphthyl and can be further substituted in the $C_1-C_4$alkyl, phenyl and naphthyl radical by the abovementioned substituents. Preferred substituents of benzene rings I and II are $C_1-C_4$alkyl, $C_1-C_4$alkoxy, $C_2-C_4$alkanoylamino and halogen, in particular methyl, methoxy, acetylamino and chlorine.

Preferably, the azo dyes of the formula (1) contain only one sulfo group.

$A_1$, $A_2$, $A_4$, $D_1$, $D_2$, $D_3$, $D_4$, $D_5$, $E_1$ or $E_3$ as $C_1-C_4$alkyl are methyl, ethyl, n-propyl, isopropyl, n-butyl, sec-butyl, isobutyl or tert-butyl.

$A_5$ as an alkyl radical is preferably a straight-chain or branched $C_1-C_8$alkyl radical. Examples are: methyl, ethyl, propyl, isopropyl, butyl, sec-butyl, tert-butyl, isobutyl, 1-pentyl, 3-pentyl, 1-heptyl, 3-heptyl and 1-octyl.

$D_4$ and $D_5$ as hydroxyalkyl radical are a straight-chain or branched hydroxyalkyl radical, for example a $\beta$-hydroxyethyl, $\beta$-hydroxylpropyl, $\beta$-hydroxybutyl or $\alpha$-ethyl-$\beta$-hydroxyethyl radical.

$A_1$, $A_2$, $D_1$, $D_2$, $D_3$, $E_1$ or as $C_1-C_4$alkoxy are methoxy, ethoxy, n-propoxy, isopropoxy, n-butoxy, sec-butoxy, isobutoxy or tert-butoxy.

$D_1$, $D_2$ or $D_3$ as hydroxyalkoxy radical are a straight-chain or branched hydroxyalkoxy radical, for example a $\beta$-hydroxyethoxy, $\beta$-hydroxypropoxy, $\beta$-hydroxybutoxy or $\alpha$-ethyl-$\beta$-hydroxyethoxy radical.

Examples of $A_1$, $A_2$, $D_1$, $D_2$, $D_3$ or $E_1$ as $C_2-C_4$alkanoylamino are acetylamino, propionylamino or butyrylamino.

$A_3$ or $B_1$ as substituted or unsubstituted phenyl- or naphthylsulfonyl or $E_2$ as substituted or unsubstituted phenyl- or naphthylaminosulfonyl or $A_4$ as substituted or unsubstituted phenyl or naphthyl can be further substituted in the phenyl or naphthyl ring for example by $C_1-C_4$alkyl groups, such as methyl and ethyl, $C_1-C_4$alkoxy groups, such as methoxy and ethoxy, halogen, such as fluorine, chlorine and bromine, alkanoylamino groups having 1 to 6 carbon atoms, such as acetylamino, and hydroxyl. The radical $A_4$ as phenyl or naphthyl can also be substituted by sulfo.

$A_1$, $A_2$, $E_1$, $E_2$ or $E_3$ as halogen are fluorine, chlorine, or bromine.

$A_3$ as a substituted or unsubstituted $C_1-C_4$alkylaminosulfonyl radical can be, for example, a sulfo-substituted radical. Examples are ethylaminosulfonyl and $\beta$-sulfoethylaminosulfonyl.

$A_1$, $A_2$ or $A_4$ as a substituted or unsubstituted alkyl radical are, independently of one another, preferably a straight-chain or branched $C_1-C_4$alkyl radical which may be further substituted, for example by halogen, such as fluorine, chlorine or bromine, hydroxyl, cyano, $C_1-C_4$alkoxy, such as methoxy or ethoxy, and alkanoyl groups having 1 to 6 carbon atoms, such as an acetyl or propionyl group, and a benzoyl group. Alkyl radical $A_4$ can also be substituted by sulfo. Examples are: methyl, ethyl, propyl, isopropyl, butyl, sec-butyl, tert-butyl, isobutyl and trifluoromethyl.

Examples of substituents of benzene rings I, II, III, IV, V and VI are: alkyl groups having 1 to 8, preferably 1 to 4, carbon atoms, for example methyl, ethyl, propyl, isopropyl, butyl, isobutyl, sec-butyl, tert-butyl, hexyl, octyl, it being possible for the alkyl groups to be substituted by sulfo or sulfato, alkoxy groups having 1 to 8 carbon atoms, in particular 1 to 4 carbon atoms, for example methoxy, ethoxy, propoxy, isopropoxy, butoxy, it being possible for the alkoxy group to be substituted in the alkyl radical by sulfo or sulfato, acylamino groups, such as alkanoylamino groups having 2 to 8 carbon atoms and alkoxycarbonylamino groups having 2 to 8 carbon atoms, for example acetylamino, propionylamino, methoxycarbonylamino, ethoxycarbonylamino, alkanoyl groups having 2 to 8, preferably 2 to 4, carbon atoms, for example acetyl, propionyl, butyryl or isobutyryl, $C_5-C_7$-cycloalkylcarbonyl, for example cyclohexylcarbonyl, $C_5-C_7$cycloalkylcarbonyl which is substituted in the cycloalkyl ring by $C_1-C_4$alkyl, for example methyl, ethyl, propyl, butyl, or halogen, for example fluorine, chlorine, bromine, sulfo or sulfato, benzoyl, benzoyl which is substituted in the phenyl ring by $C_1-C_4$alkyl, for example methyl, ethyl, propyl, butyl, or halogen, for example fluorine, chlorine, bromine, sulfo or sulfato, unsubstituted or $C_1-C_4$alkyl-, halogen, sulfo- or sulfato-substituted benzothiazole or benzoxazole, benzoylamino, amino, mono- or dialkylamino having 1 to 8 carbon atoms in the alkyl radical, phenylamino, alkoxycarbonyl having 1 to 8 carbon atoms in the alkoxy radical, $C_5-C_7$cycloalkylaminosulfonyl, nitro, cyano, trifluoromethyl, halogen, such as fluorine, bromine or in particular chlorine, sulfamoyl, sulfamoyl which is mono-or disubstituted on the nitrogen atom by $C_1-C_4$alkyl, $C_5-C_7$cycloalkyl or phenyl, carbamoyl, ureido, hydroxyl, $C_1-C_8$alkysulfonyl, $C_1-C_8$alkylaminosulfonyl, $C_1-C_4$alkysulfonylaminosulfonyl, phenylsulphonyl which is unsubstituted or substituted in the phenyl ring by $C_1-C_4$alkyl, halogen, for example, fluorine, chlorine, bromine, sulfo or sulfato, carboxyl, sulfomethyl, sulfo, sulfato, thiosulfato, and phenyl, naphthyl, phenoxy, phenoxysulfonyl and phenylaminosulfonyl, it being possible for the phenyl or naphthyl radicals mentioned to be further substituted by the abovementioned substituents.

For the dye mixtures according to the invention, those azo dyes of the formula (1) are preferred in which
$R_1$ and $R_2$ are, independently of one another, hydrogen, $C_1-C_4$alkyl or phenyl;
$R_3$ is hydrogen, $C_1-C_4$alkyl or phenyl;
$R_4$ is hydrogen or a radical of the formula

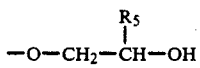

and R$_5$ is hydrogen or unsubstituted or hydroxyl-substituted C$_1$-C$_4$alkyl;

benzene rings I and II, independently of one another, may be further substituted by C$_1$-C$_4$alkyl, C$_1$-C$_4$alkoxy, C$_2$-C$_4$alkanoylamino or halogen;

the sulfo group is bound to benzene ring I.

For the dye mixtures according to the invention, in particular those azo dyes of the formula (1) are preferred in which R$_1$ and R$_2$, independently of one another, are hydrogen or C$_1$-C$_4$alkyl, R$_3$ is hydrogen, C$_1$-C$_4$alkyl or phenyl, R$_4$ is hydrogen or a radical of the formula

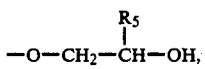

R$_5$ is hydrogen or unsubstituted or hydroxyl-substituted C$_1$-C$_4$alkyl, benzene rings I and II, independently of one another, may be further substituted by C$_1$-C$_4$alkyl, C$_1$-C$_4$alkoxy, C$_2$-C$_4$alkanoylamino or halogen, and the sulfo group is bound to benzene ring I.

Furthermore, those azo dyes of the formula (1) are of interest in which R$_1$ and R$_2$, independently of one another, are hydrogen or C$_1$-C$_4$alkyl, in particular methyl or ethyl, and R$_4$ is a radical of the formula

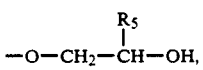

in which R$_5$ is hydrogen or unsubstituted or hydroxyl-substituted C$_1$-C$_4$alkyl, or those azo dyes of the formula (1) in which R$_1$ is hydrogen or C$_1$-C$_4$alkyl, in particular methyl or ethyl, R$_2$ is C$_2$-C$_4$alkyl, in particular ethyl, and R$_4$ is hydrogen.

The dyes which are very particularly preferred as azo dyes of the formula (1) for the dye mixtures according to the invention are those of the formula

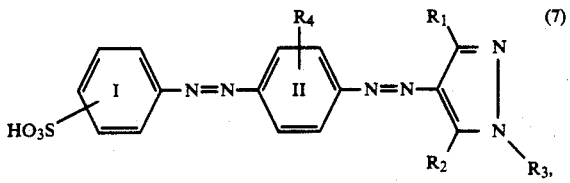

(7)

in which R$_1$ and R$_2$, independently of one another, are methyl or ethyl, R$_3$ is hydrogen, methyl, ethyl, or phenyl, R$_4$ is hydrogen or a radical of the formula

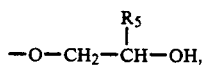

R$_5$ is methyl or ethyl and benzene rings I and II, independently of one another, may be further substituted by methyl, methoxy, acetylamino or chlorine. Of interest are dyes of the formula (7) in which R$_1$ and R$_2$, independently of one another, are methyl or ethyl, R$_4$ is a radical of the formula

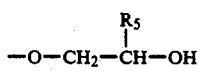

and R$_5$ is methyl or ethyl, or in which R$_1$ is methyl or ethyl, R$_2$ is ethyl and R$_4$ is hydrogen.

Preferred dyes of the formula (2) are dyes of the formula

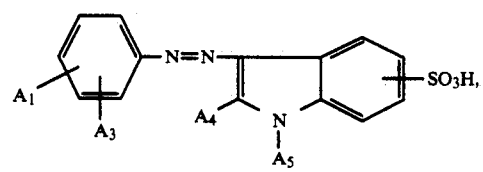

(8a)

in which A$_1$ is hydrogen, C$_1$-C$_4$alkyl, C$_1$-C$_4$alkoxy, C$_2$-C$_4$alkanoylamino or halogen, A$_3$ is phenylsulfonyl, A$_4$ is C$_1$-C$_4$alkyl or phenyl and A$_5$ is hydrogen or C$_1$-C$_8$alkyl, and dyes of the formula

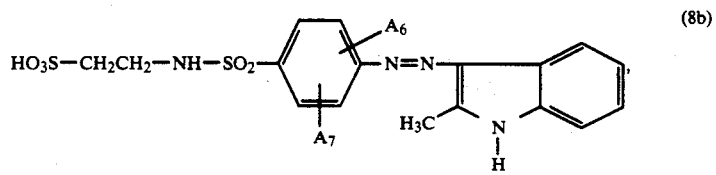

(8b)

in which A$_6$ and A$_7$ are hydrogen, C$_1$-C$_4$alkyl, C$_1$-C$_4$alkoxy, C$_2$-C$_4$alkanoylamino or halogen.

Preferred dyes of the formula (3) are dyes of the formula

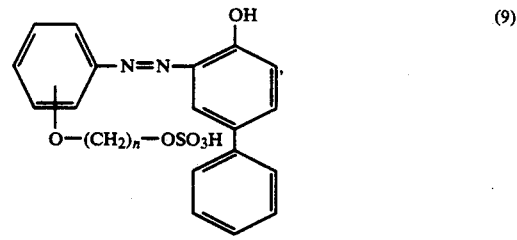

(9)

in which n is the number 1 to 3.

Preferred dyes of the formula (4) are dyes of the formula

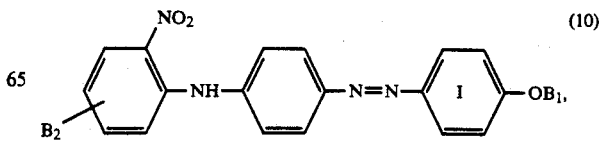

(10)

in which $B_1$ is hydrogen or unsubstituted or $C_1$-$C_4$alkyl-, $C_{1-4}$alkoxy- or halogen-substituted phenylsulfonyl, $B_2$ is sulfo or $C_1$-$C_4$alkysulfonylaminosulfonyl and benzene ring I is unsubstituted or substituted by $C_1$-$C_4$alkyl, $C_{1-4}$alkoxy or halogen.

Preferred dyes of the formula (5) are dyes of the formula

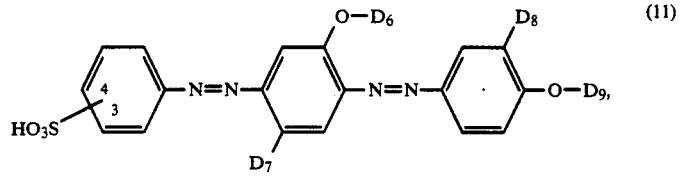
(11)

in which $D_7$ is hydrogen or methyl, $D_8$ is hydrogen or methyl and $D_6$ and $D_9$, independently of one another, are hydrogen, methyl, ethyl, β-hydroxyethyl, β-hydroxypropyl, β-hydroxybutyl or α-ethyl-β-hydroxyethyl, and the sulfo group is bound in the 3 or 4 position.

Preferred dyes of the formula (6) are those in which $E_1$ is hydrogen or sulfo and $E_2$ is halogen or phenylaminosulfonyl, $(E_3)_{1-3}$ is 1 to 3 substituents $E_3$ and $E_3$ is hydrogen, halogen or sulfo.

Preference is given to a dye mixture comprising at least one dye of the formula (1) and at least one dye of the formulae (8a), (8b), (9), (10), (11) and of the formula (6) in its preferred meaning, the dye of the formula (1) preferably having the abovementioned preferences. The dye mixture contains in particular a dye of the formula (7) as dye of the formula (1).

Very particular preference is given to a dye mixture comprising at least one dye of the formula (1) and at least one dye of the formulae (2) and (5), in particular at least one dye of the formulae (8a) and (11), the dye of the formula (1) preferably having the abovementioned preferences. The dye mixture in particular contains a dye of the formula (7) as dye of the formula (1).

Of very particular importance is a dye mixture comprising at least one dye of the formula (1) and at least one dye of the formulae In the dye mixtures according to the invention, a ratio of the dyes of the formula (1) to those of the formulae (2) to (6) of 20:80 to 80:20 and in particular of 40:60 to 60:40 is preferred. A ratio of the dyes of the formula (1) to those of the formulae (2) to (6) of 55:45 to 45:55 is very particularly preferred.

The dyes of the formulae (2), (3), (4), (5) and (6) are known or can be prepared in analogy to known compounds.

The azo dyes of the formula (1) are prepared, for example, by diazotizing an amine of the formula

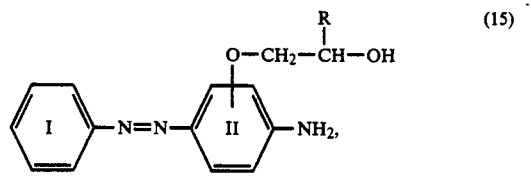
(15)

in which R is as defined in formula (1) and benzene rings I and II are substituted or unsubstituted, and coupling the product onto a coupling component of the formula

(16a)

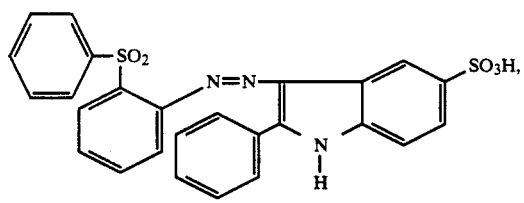
(12)

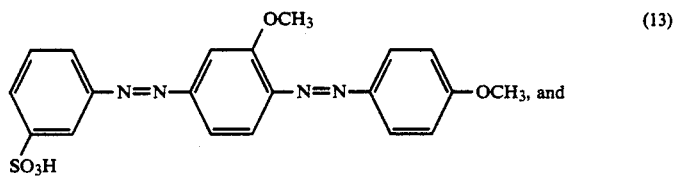
(13)

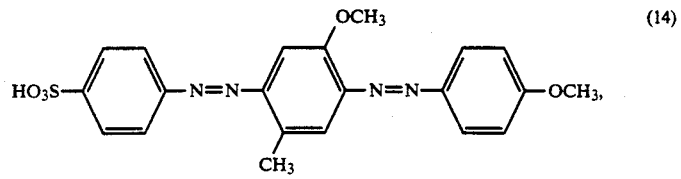
(14)

in which $R_1$ and $R_2$, independently of one another, are substituted or unsubstituted $C_1$–$C_8$alkyl or phenyl, or onto a coupling component of the formula

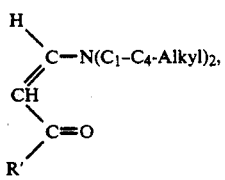 (16b)

in which R' has the meanings given for $R_1$ and $R_2$ in formula (1), and reacting the reaction product of the formula

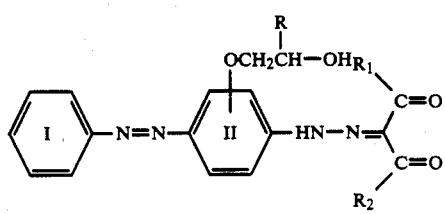 (17)

with a hydrazine of the formula $$H_2N-NH-R_3 \qquad (18)$$

in which $R_3$ is as defined in formula (1), the amine of the formula (15), the reacted coupling component of the formula (16a) or (16b) and the hydrazine of the formula (18) together containing at least one sulfo group. Accordingly, if the amine of the formula (15) or the reacted coupling component of the formula (16a) or (16b) contains a sulfo group, the reaction product of the formula (17) also contains such a group.

Diazotization of the amine of the formula (15) usually takes place by reaction with nitrous acid in aqueous mineral acid solution at low temperature, and coupling onto the coupling component of the formula (16a) or (16b) takes place at acidic, neutral to weakly alkaline pH values, in particular at a pH of 2 to 6.

Reaction of the compound of the formula (17) with a hydrazine of the formula (18) takes place in water, an organic solvent, for example methanol, ethanol, pyridine or glacial acetic acid, or a mixture of water and an organic solvent, for example water/glacial acetic acid, at a temperature of 40° to 100° C., in particular at a temperature of 40° to 60° C.

The amines of the formula (15), the coupling component of the formulae (16a) and (16b) and the hydrazines of the formula (18) are known per se or can be prepared in analogy to known compounds.

Examples of amines of the formula (15) are:

3-(β-hydroxypropoxy)-4-aminoazobenzene-2'-, -3'- or -4'-sulfonic acid, 3-(β-hydroxypropoxy)-4-amino-6-methylazobenzene-2'-, -3'- or -4'-sulfonic acid, 3-(β-hydroxypropoxy)-4-amino-6-methoxyazobenzene-2'-, -3'-, or -4'-sulfonic acid, 3-(β-hydroxypropoxy)-4-amino-6-acetylaminoazobenzene-2'-, -3'- or -4'-sulfonic acid, 3-(β-hydroxypropoxy)-4-amino-6-chloroazobenzene-2'-, -3'- or -4'-sulfonic acid, 3-(β-hydroxypropoxy)-4-amino-2'-chloroazobenzene-3'-, 4'-, -5'- or -6'-sulfonic acid, 3-(β-hydroxybutoxy)-4-aminoazobenzene-2'-, -3'- or -4'-sulfonic acid, 3-(β-hydroxybutoxy)-4-amino-6-methylazobenzene-2'-, 3'- or -4'-sulfonic acid, 3-(β-hydroxybutoxy)-4-amino-6-methoxyazobenzene-2'-, -3'- or -4'-sulfonic acid, 3-(β-hydroxybutoxy)-4-amino-6-acetylaminoazobenzene-2'-, -3'- or -4'-sulfonic acid, 3-(β-hydroxybutoxy)-4-amino-6-chloroazobenzene-2'-, -3'- or -4'-sulfonic acid, 3-(β-hydroxybutoxy)-4-amino-2'-chloroazobenzene-3'-, -4'-, -5'- or -6'-sulfonic acid, 4-aminoazobenzene-2'-, -3'- or -4'-sulfonic acid and 3-methoxy-4-aminoazobenzene-2'-, -3'- or -4'-sulfonic acid.

Examples of coupling components of the formulae (16a) and (16b) are 3diethylaminopropen-1-al, 4-diethylaminobuten-2-one, 2,4-pentanedione, 2,4-hexanedione, 3,5-heptanedione, 2,4-heptanedione, 3,5-octanedione, 4,6-octanedione, dibenzoylmethane, formylacetophenone and benzoylacetone.

Examples of compounds of the formula (18) are hydrazine, methyl-, ethyl-, propyl-, isopropyl-, butyl-, isobutyl-, sec-butyl-, tert-butyl, phenyl- and cyclohexylhydrazine and 4-sulfophenylhydrazine.

The dye mixture according to the invention can be prepared, for example, by mixing the individual dyes. This mixing process takes place, for example, in suitable mills, for example ball and pinned-disc mills, and in kneaders or mixers.

Furthermore, the dye mixtures can be prepared, for example, by spray-drying of the aqueous dye mixtures.

The invention furthermore relates to a process for the dyeing and printing of natural or synthetic polyamide fibre materials using a dye mixture comprising at least one dye of the formula (1) and at least one dye of the formulae (2) to (6). Examples of synthetic polyamide fibre materials are nylon 6.6 or nylon 6 fibre materials and an example of natural polyamide fibre materials is wool. The customary dyeing and printing processes are used for dyeing and printing.

The dye mixture comprising a dye of the formula (1) and at least one dye of the formulae (2) to (6) is suitable in particular for dyeing and printing in combination with other dyes and in particular for dyeing and printing by the principle of trichromatic dyeing. Trichromatic dyeing is understood to mean the additive mixing of three suitably selected yellow- or orange-, red- and blue-dyeing dyes in the amounts necessary for obtaining the desired shade. The dye mixture according to the invention is particularly suitable for dyeing from short liquors, for example in continuous dyeing processes or batchwise and continuous foam dyeing processes.

The dye mixture according to the invention is distinguished by generally good properties, for example good solubility, solution stability in the cold, good affinity and in particular by good compatibility with other dyes and uniform good affinity for different fibre materials.

The textile material to be dyed or printed can be present in a wide range of processing forms, for example as fibre, yarn, woven fabric or knitted fabric and in particular in the form of carpets.

In the dye mixture according to the invention, the dyes of the formulae (1), (2), (3), (4), (5) and (6) are present either in the form of their free sulfonic acid or, preferably, as salts thereof, for example as alkali metal salts, alkaline earth metal salts or ammonium salts or as salts of an organic amine. Examples are the sodium salts, lithium salts or ammonium salts or the salt of triethanolamine.

As a rule, the dye mixture contains further additives, for example common salt or dextrin.

The dye liquors or printing pastes can also contain further additives, for example wetting agents, antifoams, levelling agents, or agents affecting the property of the textile material, for example softeners, flame retardants or soil-, water-, and oil-repellent agents and water softeners and natural or synthetic thickeners, for example alginates and cellulose ethers.

The invention furthermore relates to a process for the trichromatic dyeing or printing of natural and synthetic polyamide fibre materials using a dye mixture comprising a yellow-or orange-dyeing mixture according to the invention of at least one dye of the formula (1) and at least one dye of the formulae (2) to (6) together with at least one red-dyeing dye and at least one blue-dyeing dye, the yellow- or orange-dyeing mixture according to the invention of at least one dye of the formula (1) and at least one dye of the formulae (2) to (6) having in particular the abovementioned preferences. In the process according to the invention for trichromatic dyeing or printing, at least one dye of the formula (1) is preferably used together with at least one of the red-dyeing dyes of the formulae (19), (20) and (21)

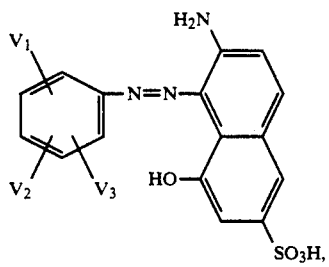

(19)

In which $V_1$ is substituted or unsubstituted $C_1$-$C_8$alkyl, halogen, phenylsulfonyl or phenoxysulfonyl which are unsubstituted or substituted in the phenyl ring by $C_1$-$C_4$alkyl, or is cyclohexyloxycarbonylamino, $C_2$-$C_4$alkanoylamino, benzoylamino which is unsubstituted or substituted in the phenyl ring by halogen, 1-azacycloheptane-N-sulfonyl or

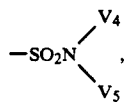

in which $V_4$ is $C_1$-$C_8$alkyl or phenyl or cyclohexyl which are unsubstituted or substituted by $C_1$-$C_4$alkyl, and $V_5$ is hydrogen or $C_1$-$C_8$alkyl, $V_2$ is hydrogen, halogen, $C_1$-$C_8$alkyl or $C_2$-$C_4$alkanoylamino and $V_3$ is hydrogen or halogen,

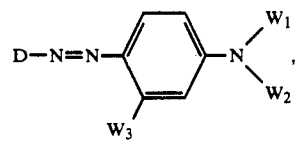

(20)

in which D is substituted or unsubstituted phenyl, thiophenyl or benzothiazolyl, $W_1$ is $C_1$-$C_8$alkyl, $W_2$ is substituted or unsubstituted $C_1$-$C_8$alkyl and $W_3$ is hydrogen or $C_1$-$C_4$alkyl, and

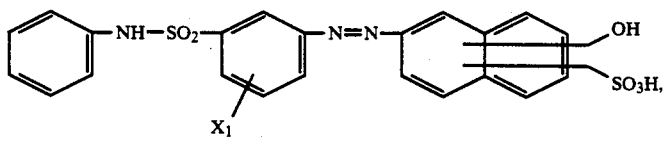

(21)

in which $X_1$ is $C_1$-$C_4$alkyl, and together with at least one blue-dyeing dye of the formula

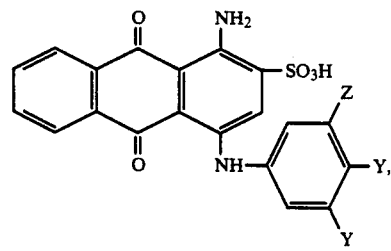

(22)

in which one Y is hydrogen or methyl and the other Y is $C_{2-4}$alkanoylamino or $C_2$-$C_4$hydroxyalkylsulfamoyl and Z is hydrogen or methyl, the yellow- or orange-dyeing mixture according to the invention of at least one dye of the formula (1) and at least one dye of the formulae (2) to (6) having in particular the abovementioned preferences.

The dyes of the formulae (19), (20), (21) and (22) used in the process according to the invention of trichromatic dyeing or printing are known per se or can be prepared in analogy to known dyes.

Examples of $V_1$, $V_2$, $V_4$ and $V_5$ in the formula (19) and of $W_1$ and $W_2$ in formula (20) as $C_1$-$C_8$alkyl are, independently of one another, methyl, ethyl, propyl, isopropyl, butyl, sec-butyl, tert-butyl, isobutyl, pentyl, hexyl, heptyl, and octyl. Preferably, $V_1$, $V_2$, $V_4$, $V_5$, $W_1$ and $W_2$ are $C_1$-$C_4$alkyl.

The radical $V_1$ in formula (19) as $C_1$-$C_8$alkyl can be substituted, for example, by halogen, for example chlorine or bromine and in particular fluorine. One example is the trifluoromethyl radical.

The radical $W_2$ in formula (20) as $C_1$-$C_4$alkyl can be substituted, for example, by sulfo, sulfato or phenyl. Examples are benzyl, β-sulfoethyl, γ-sulfopropyl and γ-sulfatoethyl.

Examples of $V_1$, $V_2$ and $V_3$ in formula (19) as halogen are, independently of one another, fluorine, bromine or in particular chlorine.

The radical $V_1$ in formula (19) as benzoylamino can be substituted in the phenyl ring by halogen, for example fluorine, bromine or in particular chlorine.

The radical $V_4$ as phenyl or cyclohexyl and the radical $V_1$ as phenylsulfonyl or phenoxysulfonyl can be substituted by $C_1$-$C_4$alkyl, for example methyl, ethyl, propyl, isopropyl, butyl, sec-butyl, tert-butyl or isobutyl, in particular methyl.

Examples of $W_3$ in formula (20) and of $X_1$ in formula (21) as $C_1-C_4$alkyl are, independently of one another, methyl, ethyl, propyl, isopropyl, butyl, sec-butyl, tert-butyl or isobutyl, in particular methyl.

Examples of $V_1$ and $V_2$ in formula (19) and of Y in formula (22) as $C_2-C_4$alkanoylamino, are, independently of one another, acetylamino, propionylamino or butyrylamino.

The radical D in formula (20) can be substituted, for example, by halogen, such as fluorine, chlorine or bromine, $C_1-C_4$alkyl, such as methyl, ethyl, propyl, isopropyl, butyl, sec-butyl, tert-butyl or isobutyl, $C_1-C_4$alkoxy, for example methoxy, ethoxy, propoxy or butoxy, $C_1-C_4$alkoxycarbonyl, for example methoxycarbonyl or ethoxycarbonyl, sulfo or $C_1-C_4$alkylaminosulfonyl which is unsubstituted or substituted in the alkyl moiety by sulfo, for example methylaminosulfonyl, ethylaminosulfonyl or β-sulfoethylaminosulfonyl.

Examples of Y in formula (22) as $C_{2-4}$hydroxyalkylsulfamoyl are β-hydroxyethysulfamoyl, β-hydroxypropylsulfamoyl, γ-hydroxypropylsulfamoyl or β-hydroxybutylsulfamoyl.

For the process according to the invention for trichromatic dyeing or printing, at least one of the red-dyeing dyes of the formulae (19), (20) and (21) is preferably used, in which in the dye of the formula (19) $V_1$ is trifluoromethyl, chlorine, acetylamino, $-SO_2N(n-C_4H_9)_2$, phenoxysulfonyl, phenylsulfonyl, 1-azacycloheptane-N-sulfonyl, cyclohexyloxycarbonylamino, benzoylamino which is unsubstituted or substituted in the phenyl ring by chlorine, or phenylaminosulfonyl which is unsubstituted or substituted in the phenyl ring by methyl, cyclohexylaminosulfonyl, N-($C_1-C_2$alkyl)-phenyl- or N-($C_1-C_2$alkyl)cyclohexylaminosulfonyl, $V_2$ is hydrogen, methyl, chlorine or acetylamino and $V_3$ is hydrogen or chlorine, and in the dye of the formula (20) D is phenyl which is substituted by chlorine, sulfo, methylaminosulfonyl, ethylaminosulfonyl or β-sulfoethylaminosulfonyl, thiophenyl which is substituted by methyl, methoxy- or ethoxycarbonyl or benziothiophenyl which is unsubstituted or substituted by methyl, methoxy or sulfo, $W_1$ is ethyl, $W_2$ is ethyl, β-sulfatoethyl, $-(CH_2)_{2-3}-SO_3H$ or benzyl and $W_3$ is hydrogen or methyl, and in the dye of the formula (21) $X_1$ is methyl.

Particularly preferably, at least one of the red-dyeing dyes of the formulae

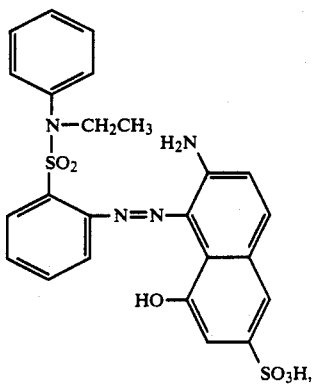

(23)

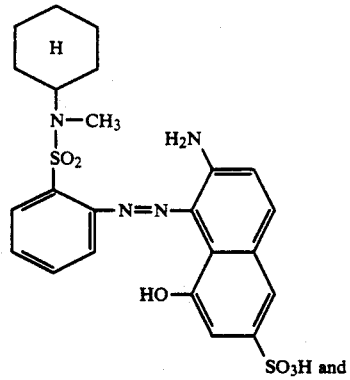

(24)

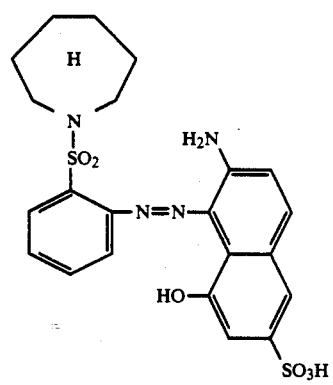

(25)

is used.

Also particularly preferably, at least one of the blue-dyeing dyes of the formulae

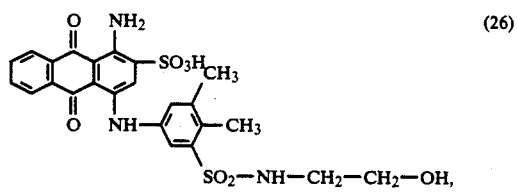

(26)

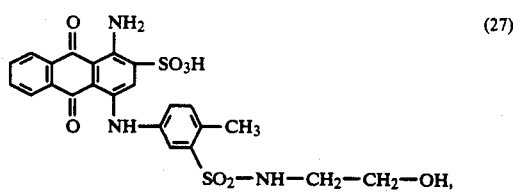

(27)

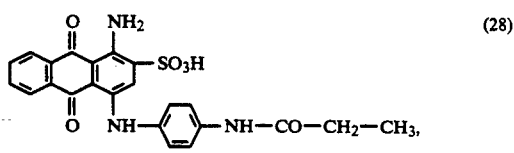

(28)

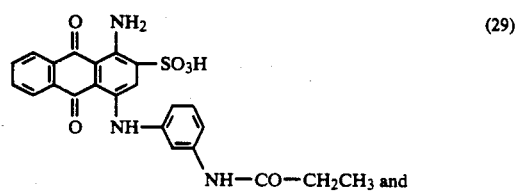

(29)

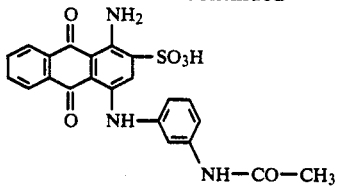

(30)

is used for the process according to the invention.

When mixtures of blue-dyeing dyes are used for the process according to the invention, preference is given to the mixture of the blue-dyeing dyes of the formulae (26) or (27) with a dye of the formulae (28), (29) or (30). Of very particular importance is the mixture of the blue-dyeing dyes of the formulae

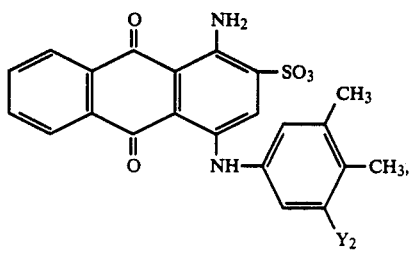

(31)

in which $Y_2$ is a $C_{2-4}$hydroxyalkylsulfamoyl radical, and

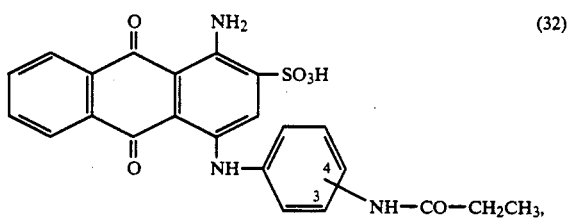

(32)

in which the radical —NH—CO—CH$_2$CH$_3$ is bound in 3 or 4 position.

For the process according to the invention for trichromatic dyeing or printing, a yellow-or orange-dyeing mixture according to the invention comprising at least one dye of the formula (1) and at least one dye of the formulae (2) to (6) is very particularly preferably used together with at least one of the red-dyeing dyes of the formulae (23), (24) and (25), in particular (23) and (24), and at least one of the blue-dyeing dyes of the formulae (26), (27), (28), (29) and (30), the yellow- or orange-dyeing mixture according to the invention comprising at least one dye of the formula (1) and at least one dye of the formulae (2) to (6) having in particular the abovementioned preferences.

The dye mixtures used in the process according to the invention can be prepared, for example, by mixing the individual dyes. This mixing process takes place, for example, in suitable mills, for example ball and pinned-disc mills, and in kneaders or mixers.

Furthermore, the dye mixtures of the dyes can be prepared, for example, by spray-drying of the aqueous dye mixtures.

The dyes used in the process according to the invention for trichromatic dyeing or printing are present either in the form of their free sulfonic acid or, preferably, as salts thereof.

Examples of salts are the alkali metal salts, alkaline earth metal salts or ammonium salts or the salts of an organic amine. Examples are the sodium salts, lithium salts, potassium salts or ammonium salts or the salt of mono-, di- or triethanolamine.

As a rule, the dyes used in the process according to the invention contain further additives, for example common salt or dextrin.

The process according to the invention for trichromatic dyeing or printing can be applied to the customary dyeing and printing processes. The dye liquors or printing pastes can contain, in addition to water and the dyes, further additives, for example wetting agents, antifoams, levelling agents or agents affecting the property of the textile material, for example softeners, flame retardants or soil-, water- and oil-repellent agents and water softeners and natural or synthetic thickeners, for example alginates and cellulose ethers.

The process according to the invention for trichromatic dyeing or printing is particularly suitable for dyeing from short liquors, for example in continuous dyeing processes or batchwise and continuous foam dyeing processes.

The dyes used in the process according to the invention are distinguished in trichromatic dyeing or printing by a uniform colour build up, good affinity, good constancy of shade, even in different concentrations, good fastness properties and in particular by very good compatibility.

The process according to the invention for trichromatic dyeing or printing is suitable for the dyeing or printing not only of natural polyamide fibre materials, for example wool, but in particular of synthetic polyamide fibre materials, for example nylon 6 or nylon 6.6, and is suitable for the dyeing or printing of wool and synthetic polyamide blend fabrics or yarns.

The textile material mentioned can be present in a wide range of processing forms, for example as fibre, yarn, woven fabric or knitted fabric and in particular in the form of carpets.

In the examples which follow, parts are by weight. Temperatures are degrees centigrade. Parts by weight relate to parts by volume as the gram relates to the cubic centimeter.

PREPARATION EXAMPLE 1

A neutral hot solution at 50° comprising 37 parts of 3-($\beta$-hydroxypropoxy)-4-aminoazobenzene-3'-sulfonic acid in 500 parts of water is run into a mixture of 28 parts of concentrated hydrochloric acid in 200 parts of water simultaneously with 26 parts of an aqueous sodium nitrite solution (4N), and the temperature of the reaction mixture is maintained at 20° to 25° C. by addition of ice. After addition is complete, stirring is continued for 2 hours, and the nitrite excess is destroyed with a small amount of sulfamic acid. The diazotisation mixture thus prepared is slowly run into a cold solution of 0° to 5° comprising 14 parts of 2,4-pentanedione and 180 parts of sodium acetate in 500 parts of water. After stirring at 0° to 5° for several hours, the mixture is heated to 30°, in order to complete the reaction, and brought to a pH of 5.5 with sodium acetate. The precipitate is then filtered off with suction and dried at 60°, giving 44 parts of an orange powder.

5 parts of the reaction product prepared by the above procedure are suspended in 80 parts of glacial acetic acid and 6 parts of water at room temperature. 1.2 parts of hydrazine hydrate are added all at once with stirring.

The reaction mixture is slowly heated to 50° and stirred for 2 hours. Finally, it is heated at 90° for about 10 minutes until no more educt can be detected by thin-layer chromatography. After cooling to room temperature, the dye is precipitated by addition of hydrochloric acid (2N). After filtration, washing with a small amount of water and drying at a temperature of 80°, 4.8 parts of a dye which in the form of the free acid corresponds to the compound of the formula

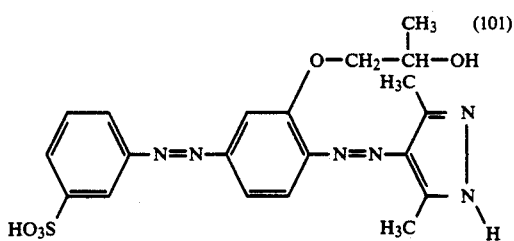

are obtained. The dye of the formula (101) dyes synthetic and natural polyamide fibre material in yellow hues.

PREPARATION EXAMPLES 2 to 18

The procedure described in Preparation Example 1 is repeated, except that an equimolar amount of one of the amines listed in Table 1 below in column 2 in the form of the free acid is used instead of 37 parts of 3-($\beta$-hydroxypropoxy)-4-aminoazobenzene-3'-sulfonic acid and, if desired, an equimolar amount of a coupling component of the formula

in which $R_1$ and $R_2$ are as defined in columns 3 and 4, is used instead of 14 parts of 2,4-pentanedione, and, if desired, an equimolar amount of a compound of the formula $$H_2N-NH-R_3 \qquad (18),$$

in which $R_3$ is as defined in column 5, is used instead of 1.2 parts of hydrazine hydrate, giving analogous dyes which dye synthetic and natural polyamide fibre materials in yellow or orange hues.

TABLE 1

| Ex. | Amine | $R_1$ | $R_2$ | $R_3$ |
|---|---|---|---|---|
| 2 | (structure with HO$_3$S-phenyl-N=N-phenyl with O-CH$_2$-CH(CH$_3$)-OH, NH$_2$, H$_3$C substituents) | —CH$_3$ | —CH$_3$ | —H |
| 3 | (structure with HO$_3$S-phenyl(para)-N=N-phenyl with O-CH$_2$-CH(CH$_3$)-OH, NH$_2$, H$_3$C substituents) | —CH$_3$ | —CH$_3$ | —H |
| 4 | (structure with HO$_3$S-phenyl(para)-N=N-phenyl with O-CH$_2$-CH(CH$_3$)-OH, NH$_2$, H$_3$C substituents) | —CH$_3$ | —CH$_3$ | —C$_2$H$_5$ |
| 5 | (structure with HO$_3$S-phenyl-N=N-phenyl with O-CH$_2$-CH(C$_2$H$_5$)-OH, NH$_2$, H$_3$C substituents) | —CH$_3$ | —CH$_3$ | —H |

TABLE 1-continued

| Ex. | Amine | R₁ | R₂ | R₃ |
|---|---|---|---|---|
| 6 | 4-chloro-3-[(2-amino-4-(2-hydroxypropoxy)-5-methylphenyl)azo]benzenesulfonic acid (C₂H₅ shown on CH group; Cl, CH₃ substituents on rings) | $-CH_3$ | $-CH_3$ | $-H$ |
| 7 | 3-[(2-amino-6-chloro-4-(2-hydroxypropoxy)phenyl)azo]benzenesulfonic acid | $-C_2H_5$ | $-C_2H_5$ | $-H$ |
| 8 | 4-[(2-acetylamino-5-amino-4-(2-hydroxypropoxy)phenyl)azo]benzenesulfonic acid | $-C_2H_5$ | $-C_2H_5$ | $-H$ |
| 9 | 3-[(2-amino-6-methoxy-4-(2-hydroxypropoxy)phenyl)azo]benzenesulfonic acid | $-C_2H_5$ | $-C_2H_5$ | $-H$ |
| 10 | 4-[(4-amino-3-(2-hydroxypropoxy)phenyl)azo]benzenesulfonic acid | $-CH_3$ | $-CH_3$ | $-H$ |
| 11 | 3-[(4-amino-3-(2-hydroxypropoxy)phenyl)azo]benzenesulfonic acid | $-CH_3$ | $-C_2H_5$ | $-H$ |
| 12 | 3-[(4-amino-3-(2-hydroxypropoxy)phenyl)azo]benzenesulfonic acid | $-C_2H_5$ | $-C_2H_5$ | $-H$ |
| 13 | 4-[(4-aminophenyl)azo]benzenesulfonic acid | $-CH_3$ | $-C_2H_5$ | $-H$ |

TABLE 1-continued

| Ex. | Amine | $R_1$ | $R_2$ | $R_3$ |
|---|---|---|---|---|
| 14 | ![structure: 3-sulfophenyl-N=N-(3-methoxy-4-amino)phenyl] | $-CH_3$ | $-C_2H_5$ | $-H$ |
| 15 | ![structure: 3-sulfophenyl-N=N-(3-methoxy-4-amino)phenyl] | $-C_2H_5$ | $-C_2H_5$ | $-H$ |
| 16 | ![structure: 3-sulfophenyl-N=N-(4-amino)phenyl] | $-C_2H_5$ | $-C_2H_5$ | -tert-$C_4H_9$ |
| 17 | ![structure: 3-sulfophenyl-N=N-(4-amino)phenyl] | $-C_2H_5$ | $-C_2H_5$ | -cyclo-$C_6H_{11}$ |
| 18 | ![structure: 3-sulfophenyl-N=N-(3-(O-CH2-CH(CH3)-OH)-4-amino)phenyl] | $-C_2H_5$ | $-C_2H_5$ | Phenyl |

EXAMPLE 1A

To prepare a dye mixture comprising a dye of the formula

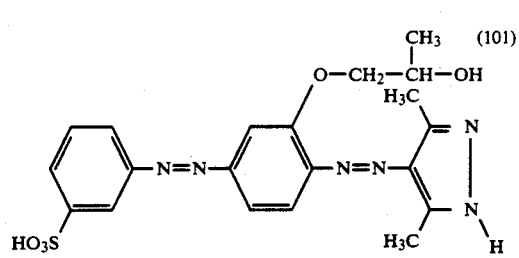

(101)

and a dye of the formula

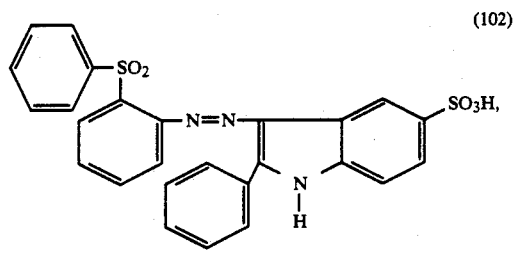

(102)

50 parts of the dye of the formula (101) and 50 parts of the dye of the formula (102) are homogeneously mixed in a mixer, giving 100 parts of a mixture designated hereinafter as dye mixture A.

EXAMPLE 1B

To prepare a dye mixture comprising a dye of the formula

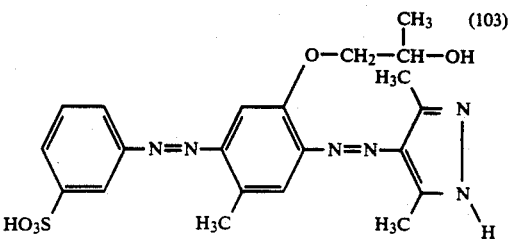

(103)

and a dye of the formula

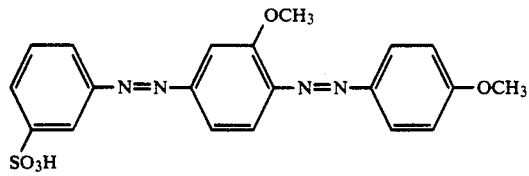

60 parts of the dye of the formula (103) and 40 parts of the dye of the formula (104) are homogeneously mixed in a mixer, giving 100 parts of a mixture designated hereinafter as dye mixture B.

EXAMPLE 1C

To prepare a dye mixture comprising a dye of the formula

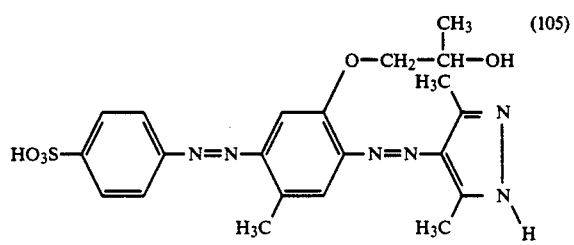

and a dye of the formula

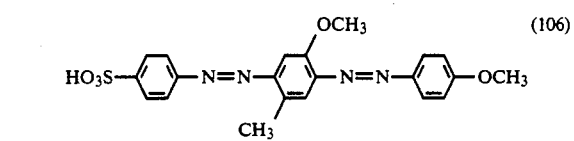

80 parts of the dye of the formula (105) and 20 parts of the dye of the formula (106) are homogeneously mixed in a mixer, giving 100 parts of a mixture designated hereinafter as dye mixture C.

EXAMPLE 1D

To prepare a dye mixture comprising a dye of the formula

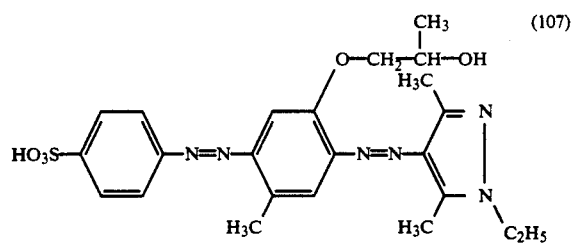

and a dye of the formula

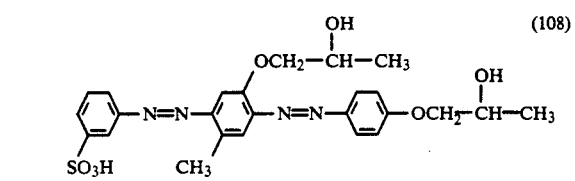

40 parts of the dye of the formula (107) and 60 parts of the dye of the formula (108) are homogeneously mixed in a mixer, giving 100 parts of a mixture designated hereinafter as dye mixture D.

EXAMPLE 1E

To prepare a dye mixture comprising a dye of the formula

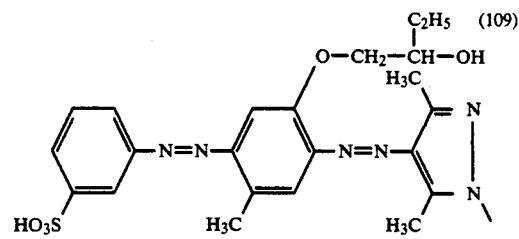

and a dye of the formula

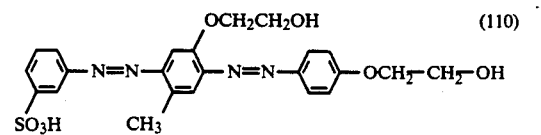

20 parts of the dye of the formula (109) and 80 parts of the dye of the formula (110) are homogeneously mixed in a mixer, giving 100 parts of a mixture designated hereinafter as dye mixture E.

EXAMPLE 1F

To prepare a dye mixture comprising a dye of the formula

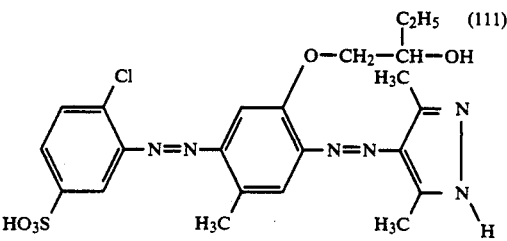

and a dye of the formula

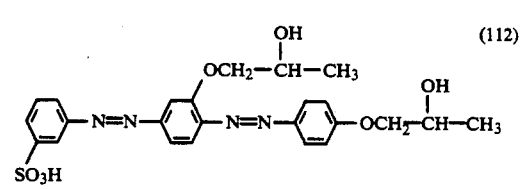

70 parts of the dye of the formula (111) and 30 parts of the dye of the formula (112) are homogeneously mixed in a mixer, giving 100 parts of a mixture designated hereinafter as dye mixture F.

EXAMPLE 1G

To prepare a dye mixture comprising a dye of the formula

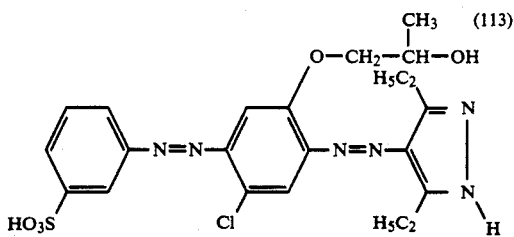

and a dye of the formula

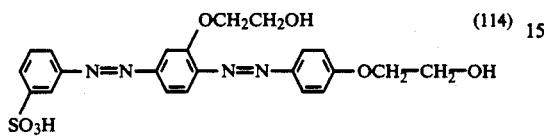

25 parts of the dye of the formula (113) and 75 parts of the dye of the formula (114) are homogeneously mixed in a mixer, giving 100 parts of a mixture designated hereinafter as dye mixture G.

EXAMPLE 1H

To prepare a dye mixture comprising a dye of the formula

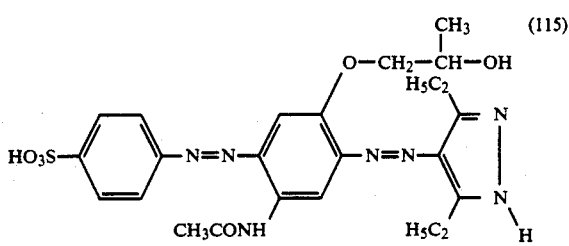

and a dye of the formula

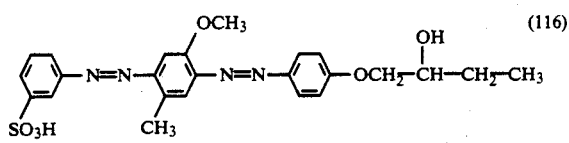

80 parts of the dye of the formula (115) and 20 parts of the dye of the formula (116) are homogeneously mixed in a mixer, giving 100 parts of a mixture designated hereinafter as dye mixture H.

EXAMPLE 1I

To prepare a dye mixture comprising a dye of the formula

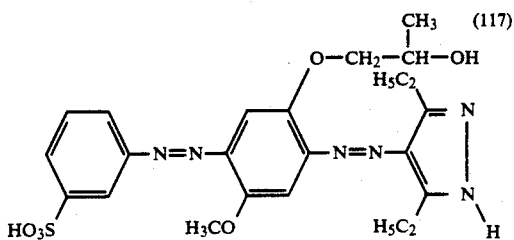

and a dye of the formula

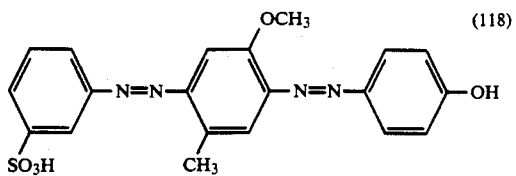

75 parts of the dye of the formula (117) and 25 parts of the dye of the formula (118) are homogeneously mixed in a mixer, giving 100 parts of a mixture designated hereinafter as dye mixture I.

EXAMPLE 1J

To prepare a dye mixture comprising a dye of the formula

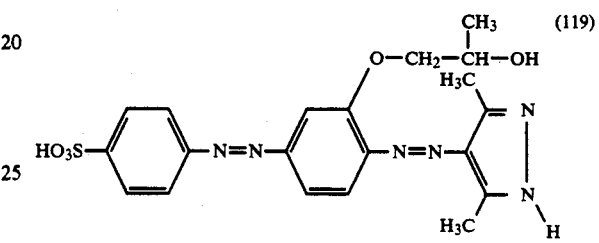

and a dye of the formula

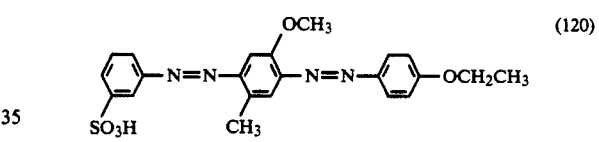

40 parts of the dye of the formula (119) and 60 parts of the dye of the formula (120) are homogeneously mixed in a mixer, giving 100 parts of a mixture designated hereinafter as dye mixture J.

EXAMPLE 1K

To prepare a dye mixture comprising a dye of the formula

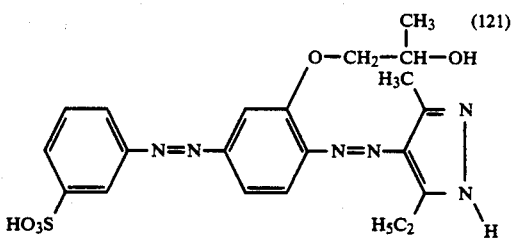

and a dye of the formula

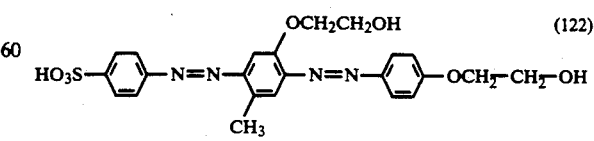

60 parts of the dye of the formula (121) and 40 parts of the dye of the formula (122) are homogeneously mixed in a mixer, giving 100 parts of a mixture designated hereinafter as dye mixture K.

EXAMPLE 1L

To prepare a dye mixture comprising a dye of the formula

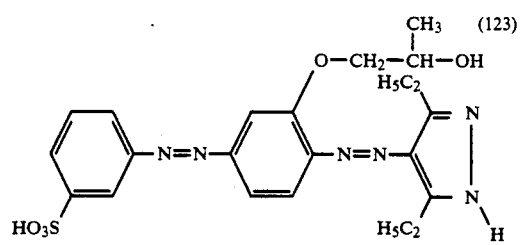

and a dye of the formula

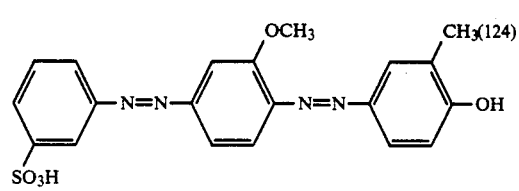

30 parts of the dye of the formula (123) and 70 parts of the dye of the formula (124) are homogeneously mixed in a mixer, giving 100 parts of a mixture designated hereinafter as dye mixture L.

EXAMPLE 1M

To prepare a dye mixture comprising a dye of the formula

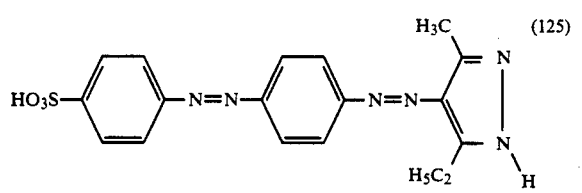

and a dye of the formula

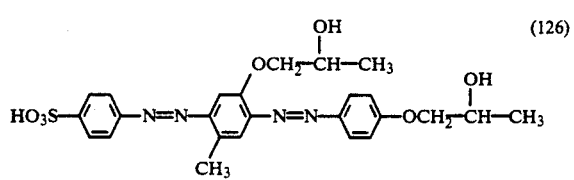

80 parts of the dye of the formula (125) and 20 parts of the dye of the formula (126) are homogeneously mixed in a mixer, giving 100 parts of a mixture designated hereinafter as dye mixture M.

EXAMPLE 1N

To prepare a dye mixture comprising a dye of the formula

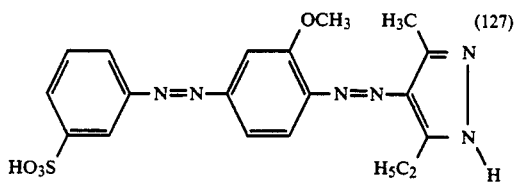

and a dye of the formula

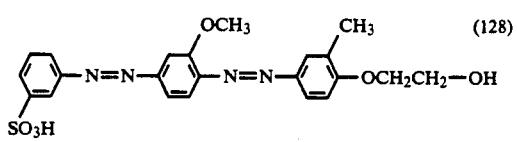

60 parts of the dye of the formula (127) and 40 parts of the formula (128) are homogeneously mixed in a mixer, giving 100 parts of a mixture designated hereinafter as dye mixture N.

EXAMPLE 1P

To prepare a dye mixture comprising a dye of the formula

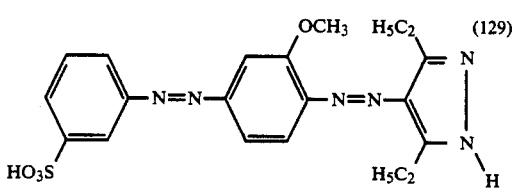

and a dye of the formula

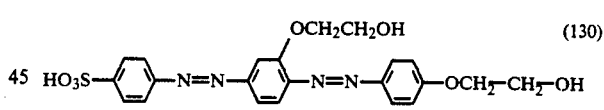

40 parts of the dye of the formula (129) and 60 parts of the dye of the formula (130) are homogeneously mixed in a mixer, giving 100 parts of a mixture designated hereinafter as dye mixture P.

EXAMPLE 1Q

To prepare a dye mixture comprising a dye of the formula

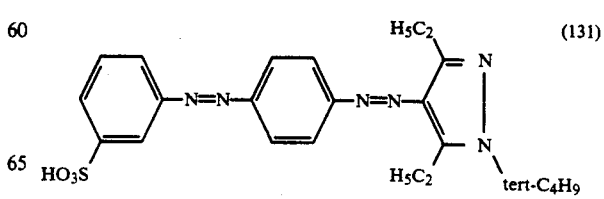

and a dye of the formula

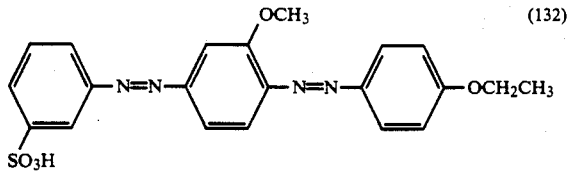
(132)

75 parts of the dye of the formula (131) and 25 parts of the dye of the formula (132) are homogeneously mixed in a mixer, giving 100 parts of a mixture designated hereinafter as dye mixture Q.

EXAMPLE 1R

To prepare a dye mixture comprising a dye of the formula

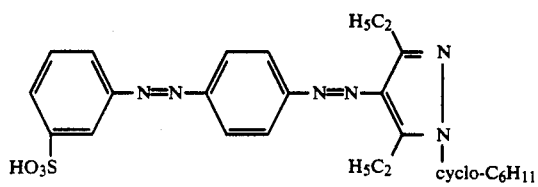

and a dye of the formula

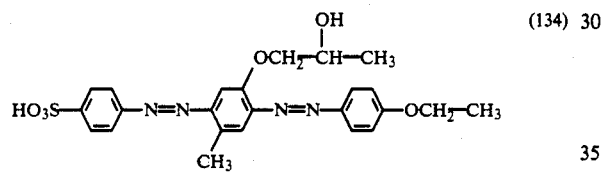
(134)

25 parts of the dye of the formula (133) and 75 parts of the dye of the formula (134) are homogeneously mixed in a mixer, giving 100 parts of a mixture designated hereinafter as dye mixture R.

EXAMPLE 1S

To prepare a dye mixture comprising a dye of the formula

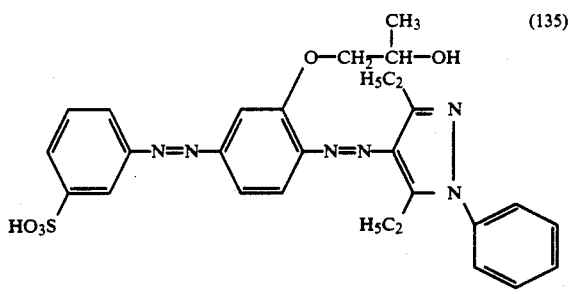
(135)

and a dye of the formula

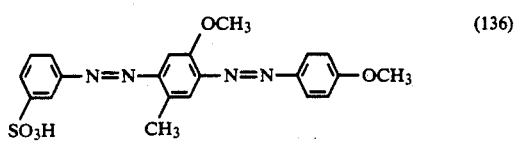
(136)

80 parts of the dye of the formula (135) and 20 parts of the dye of the formula (136) are homogeneously mixed in a mixer, giving 100 parts of a mixture designated hereinafter as dye mixture S.

EXAMPLE 2

10 parts of nylon 6.6 fiber material (Helanca knitted fabric) are dyed in 500 parts of an aqueous liquor which contains 2 g/l of ammonium acetate and is brought to a pH of 5 with acetic acid. The dyes used are 0.27% of the yellow dye mixture A according to Example 1A), 0.12% of the red dye of the formula

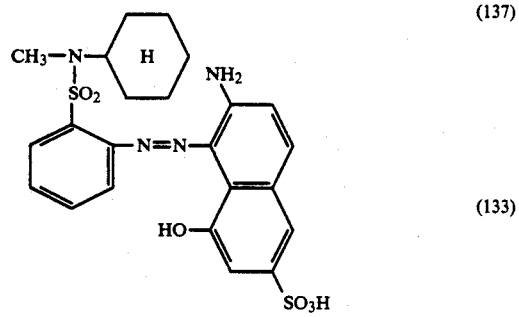
(137)

and 0.13% of the blue dye of the formula

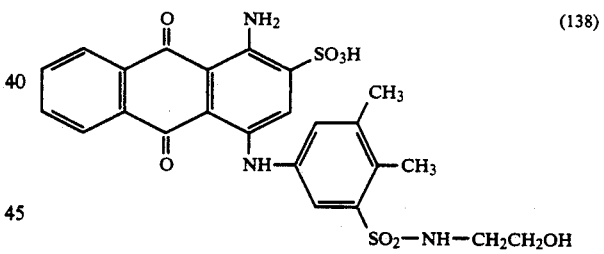
(138)

the amounts given being based on the fiber weight. The dyeing time at a temperature of 60° to 98° is 30 to 90 minutes. The dyed nylon 6.6 fiber material is then removed from the dye bath and rinsed and dried as usual, giving a piece of fabric which has been dyed completely level in a neutral brown hue and has no material-related barriness whatsoever.

The example is repeated, using the dyes of the formulae (137) and (138) listed in Table 2 below and the dye mixtures from Example 1 instead of 0.27% of the yellow dye mixture A and 0.12% of the red dye of the formula (137) and 0.13% of the blue dye of the formula (138), giving pieces of fabric which have been dyed completely level in the hue given.

TABLE 2

| Example | Dyes used | Hue |
| --- | --- | --- |
| 3 | 0.18% of dye mixture B<br>0.18% of the dye of the formula (137)<br>0.077% of the dye of the formula (138) | reddish-brown |
| 4 | 0.25% of dye mixture C<br>0.04% of the dye of the formula (137) | olive |

TABLE 2-continued

| Example | Dyes used | Hue |
|---------|-----------|-----|
| 5 | 0.14% of the dye of the formula (138)<br>0.27% of dye mixture D<br>0.12% of the dye of the formula (137)<br>0.13% of the dye of the formula (138) | neutral brown |
| 6 | 0.18% of dye mixture E<br>0.17% of the dye of the formula (137)<br>0.07% of the dye of the formula (138) | reddish-brown |
| 7 | 0.25% of dye mixture F<br>0.036% of the dye of the formula (137)<br>0.124% of the dye of the formula (138) | olive |
| 8 | 0.18% of dye mixture G<br>0.18% of the dye of the formula (137)<br>0.077% of the dye of the formula (138) | reddish-brown |
| 9 | 0.25% of dye mixture H<br>0.04% of the dye of the formula (137)<br>0.14% of the dye of the formula (138) | olive |
| 10 | 0.27% of dye mixture I<br>0.12% of the dye of the formula (137)<br>0.13% of the dye of the formula (138) | neutral brown |
| 11 | 0.18% of dye mixture J<br>0.17% of the dye of the formula (137)<br>0.07% of the dye of the formula (138) | reddish-brown |
| 12 | 0.25% of dye mixture K<br>0.036% of the dye of the formula (137)<br>0.124% of the dye of the formula (138) | olive |
| 13 | 0.27% of dye mixture L<br>0.12% of the dye of the formula (137)<br>0.13% of the dye of the formula (138) | brown |
| 14 | 0.25% of dye mixture M<br>0.04% of the dye of the formula (137)<br>0.14% of the dye of the formula (138) | olive |
| 15 | 0.27% of dye mixture N<br>0.12% of the dye of the formula (137)<br>0.13% of the dye of the formula (138) | neutral brown |
| 16 | 0.18% of dye mixture P<br>0.17% of the dye of the formula (137)<br>0.07% of the dye of the formula (138) | reddish-brown |
| 17 | 0.25% of dye mixture Q<br>0.036% of the dye of the formula (137)<br>0.124% of the dye of the formula (138) | olive |
| 18 | 0.18% of dye mixture R<br>0.18% of the dye of the formula (137)<br>0.077% of the dye of the formula (138) | reddish-brown |
| 19 | 0.25% of dye mixture S<br>0.04% of the dye of the formula (137)<br>0.14% of the dye of the formula (138) | olive |

EXAMPLE 20

10 parts of a nylon 66 yarn are dyed in 400 parts of an aqueous liquor which contains 1.5 g/l of ammonium acetate and is brought to a pH of 5.5 with acetic acid. The dyes used are 0.27% of dye mixture H, 0.12% of the dye of the formula (137) and 0.13% of the dye of the formula (138), the amounts given being based on the fibre weight. The dye bath is heated to 98° over a period of 30 minutes and maintained at 96° to 98° for 60 minutes. The dyed yarn is then removed from the dye bath and rinsed and dried as usual, giving a yarn dyed in a neutral brown hue.

EXAMPLE 21

Carpet exhaust method

A beam-dyeing apparatus (laboratory piece-dyeing apparatus, Model 10 from Rudolf Then) is in the main horizontal kier equipped with cooling jacket, which, by means of its special reversing pump, is combined with the expansion tank to give a circulation system.

A beam equipped with a nylon 6 loop-pile carpet of 50 cm in width, 135 cm in length and a weight of 380 g is introduced into this dyeing apparatus. The expansion tank is filled with 6 liters of softened water, and 60 ml of 2N sodium hydroxide solution are added. By opening the corresponding valves (expansion tank, connecting lines, pump/kier), the liquor flows from the expansion tank to the kier by virtue of its own weight, while the displaced air streams into the expansion tank via the vent line. After the dyeing apparatus has been filled, a liquor residue of about 5 cm in height remains in the expansion tank, and the recirculating pump is then turned on. For the purpose of pH control, a hole was drilled into the line between the kier and the expansion tank (flow direction) and a combined glass electrode introduced. The dye liquor circulates during the entire dyeing process from inside to outside, during which the pressure gradient is 0.1 to 0.2 bar and the delivery rate of the pump about 6 liters per minute. The liquor is heated to 98°, and 7.6 g of an anionic levelling agent with affinity for the fibre, dissolved in 100 ml of water, are added to the expansion tank over a period of 5 minutes.

The dyeing temperature is brought to 97° to 98°, and the pH is 10.7. The pH of a sample removed and cooled to 20° is 11.9.

2.5 g of the yellow dye mixture D and 1.8 g of the blue dye of the formula (138), both dissolved in 200 ml of hot water, are run into the expansion tank from a dropping funnel over a period of 10 minutes. After 30 minutes, a total of 100 ml of 1N sulfuric acid are metered in by means of a bulb-type burette at a rate of 5.5 ml per minute over a period of 10 minutes and at a rate of 2.25 ml per minute over a period of another 20 minutes.

After another 10 minutes, the pH is 3.8. The dye bath is exhausted, i.e. more than 99% of the dye has been absorbed by the material to be dyed. The heating is turned off, and the dye bath is cooled to 60° by means of the indirect cooling of the dye liquor. During this time, the pH increases to 3.9. The almost water-clear liquor is pumped back into the expansion tank, and the beam is removed. The carpet material is unwound, centrifuged and dried. The green dyeing obtained on the nylon 6 loop-pile carpet material is level in the piece.

The procedure in Example 21 is repeated, except that, instead of the dye mixture D used there, the same amount of a dye mixture comprising 50 percent by weight of the dye of the formula (101) and 50 percent by weight of one of the dyes listed in the table below is used, likewise giving a green-dyed nylon 6 loop carpet.

TABLE 3

| Example | Dye | |
|---|---|---|
| 22 | [structure] | (139) |
| 23 | [structure] | (140) |
| 24 | [structure] | (141) |
| 25 | [structure] | (142) |
| 26 | [structure] | (143) |
| 27 | [structure] | (144) |
| 28 | [structure] | (145) |
| 29 | [structure] | (146) |

TABLE 3-continued

| Example | Dye | |
|---|---|---|
| 30 | HO₃S—C₆H₄—N=N—C₆H₃(OCH₂CH(OH)CH₃)—N=N—C₆H₄—OCH₂CH(OH)CH₃ | (147) |
| 31 | (SO₃H)C₆H₄—N=N—C₆H₃(OCH₂CH(OH)CH₃)—N=N—C₆H₄—OCH₂—CH₃ | (148) |
| 32 | (SO₃H)C₆H₄—N=N—C₆H₃(OCH₃)—N=N—C₆H₃(CH₃)—OCH₂CH(OH)CH₃ | (149) |
| 33 | (SO₃H)C₆H₄—N=N—C₆H₂(OCH₂CH(OH)CH₃)(CH₃)—N=N—C₆H₄—OCH₂CH₃ | (150) |
| 34 | H₂C(O-SO₃H)—CH₂—O—C₆H₄—N=N—C₆H₃(OH)(C₆H₅) | (151) |
| 35 | (NO₂)(O₂S-NH-SO₂-CH₃)C₆H₃—NH—C₆H₄—N=N—C₆H₃(OH)(CH₃) | (152) |
| 36 | (NO₂)(HO₃S)C₆H₃—NH—C₆H₄—N=N—C₆H₃(OH)(CH₃) | (153) |
| 37 | (NO₂)(HO₃S)C₆H₃—NH—C₆H₄—N=N—C₆H₃(CH₃)—O—SO₂—C₆H₄—CH₃ | (154) |

TABLE 3-continued

| Example | Dye | |
|---|---|---|
| 38 | 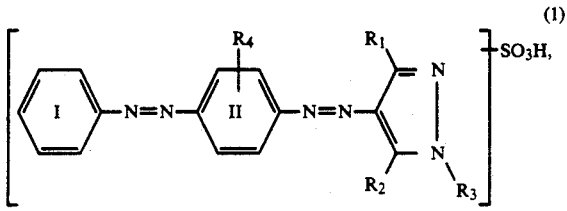 | (155) |

What is claimed is:

1. A dye mixture comprising at least one dye of the formula

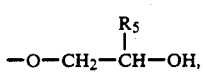

(1)

in which $R_1$ and $R_2$, independently of one another, are hydrogen or substituted or unsubstituted $C_1-C_8$alkyl or phenyl, $R_3$ is hydrogen or substituted or unsubstituted $C_1-C_8$alkyl, $C_5-C_7$cycloalkyl or phenyl, $R_4$ is hydrogen or a radical of the formula $$-O-CH_2-\underset{R_5}{\overset{|}{C}H}-OH,$$

$R_5$ is hydrogen or substituted or unsubstituted $C_1-C_8$alkyl or phenyl, and benzene rings I and II may be further substituted, together with at least one dye of the formulae (2) to (6):

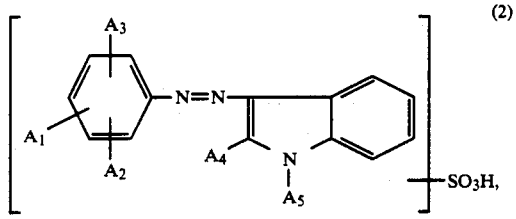

(2)

in which $A_1$ and $A_2$ are halogen, $C_1-C_4$alkoxy, $C_2-C_4$alkanoylamino or substituted or unsubstituted $C_1-C_4$alkyl, $A_3$ is substituted or unsubstituted phenylsulfonyl, naphthylsulfonyl or $C_1-C_4$alkylaminosulfonyl, $A_4$ is hydrogen, substituted or unsubstituted $C_1-C_4$alkyl, phenyl or naphthyl and $A_5$ is hydrogen or $C_1-C_8$alkyl,

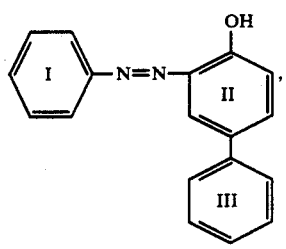

(3)

in which benzene rings I, II and III are substituted or unsubstituted,

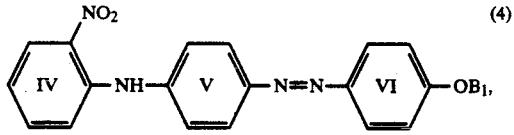

(4)

in which benzene rings IV, V and VI are substituted or unsubstituted and $B_1$ is hydrogen or substituted or unsubstituted phenyl- or naphthylsulfonyl,

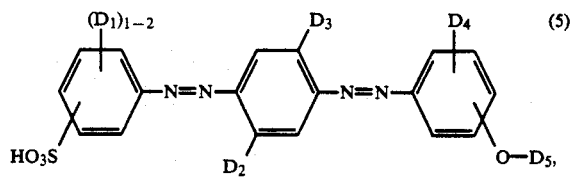

(5)

in which $D_1$, $D_2$ and $D_3$ are hydrogen, $C_{1-4}$alkyl, $C_{1-4}$alkoxy, $C_{2-4}$hydroxyalkoxy, $C_2-C_4$alkanoylamino or carbamoyl and $D_4$ and $D_5$ are hydrogen, $C_{1-4}$alkyl or $C_{2-4}$hydroxylalkyl and $(D_1)_{1-2}$ is one or two substituents $D_1$, and

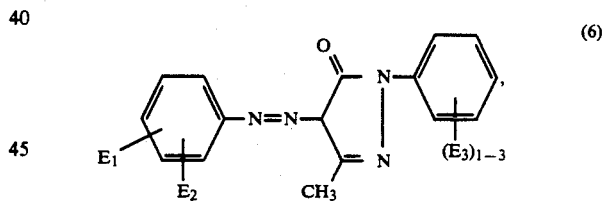

(6)

in which $E_1$ is hydrogen, $C_{1-4}$alkyl, $C_{1-4}$alkoxy, $C_{2-4}$alkanoylamino, sulfo or halogen, $E_2$ is hydrogen, halogen, sulfo or substituted or unsubstituted phenyl- or naphthylaminosulfonyl and $(E_3)_{1-3}$ is 1 to 3 substituents $E_3$ and $E_3$ is hydrogen, halogen, $C_{1-4}$alkyl, $C_{1-4}$alkoxy or sulfo.

2. A dye mixture according to claim 1, wherein in the dye of the formula (1) $R_1$ and $R_2$, independently of one another, are hydrogen, $C_1-C_4$alkyl or phenyl.

3. A dye mixture according to claim 1, wherein in the dye of the formula (1) $R_3$ is hydrogen, $C_1-C_4$alkyl or phenyl.

4. A dye mixture according to claim 1, wherein in the dye of the formula (1) $R_4$ is hydrogen or a radical of the formula

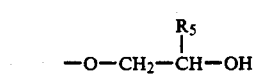

and $R_5$ is hydrogen or unsubstituted or hydroxyl-substituted $C_1$-$C_4$alkyl.

5. A dye mixture according to claim 1, wherein the dye of the formula (1) $R_1$ and $R_2$, independently of one another, are hydrogen or $C_1$-$C_4$alkyl, $R_3$ is hydrogen, $C_1$-$C_4$alkyl or phenyl, $R_4$ is hydrogen or a radical of the formula

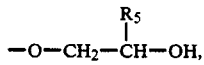

$R_5$ is hydrogen or unsubstituted or hydroxyl-substituted $C_1$-$C_4$alkyl, benzene rings I and II, independently of one another, may be further substituted by $C_1$-$C_4$alkyl, $C_1$-$C_4$alkoxy, $C_2$-$C_4$alkanoylamino or halogen and the sulfo group is bound to benzene ring I.

6. A dye mixture according to claim 1, wherein in the dye of the formula (1) $R_1$ and $R_2$, independently of one another, are hydrogen or $C_1$-$C_4$alkyl and $R_4$ is a radical of the formula

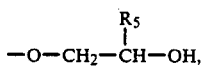

in which $R_5$ is hydrogen or unsubstituted or hydroxyl-substituted $C_1$-$C_4$alkyl, or in the dye of the formula (1) $R_1$ is hydrogen or $C_1$-$C_4$alkyl, $R_2$ is $C_2$-$C_4$alkyl and $R_4$ is hydrogen.

7. A dye mixture according to claim 1, which comprises, as dye of the formula (1), at least one dye of the formula

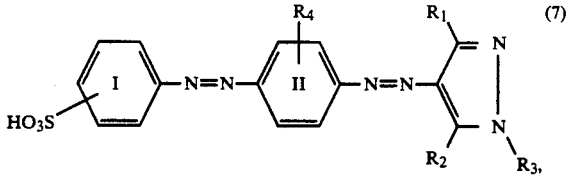

in which $R_1$ and $R_2$, independently of one another, are methyl or ethyl, $R_3$ is hydrogen, methyl, ethyl or phenyl, $R_4$ is hydrogen or a radical of the forumla

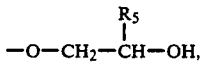

$R_5$ is methyl or ethyl and benzene rings I and II, independently of one another, may be further substituted by methyl, methoxy, acetylamino or chlorine.

8. A dye mixture according to claim 1, which comprises at least one dye of the formula (1) together with at least one dye of the formulae (6), (8a), (8b), (9), (10) and (11):

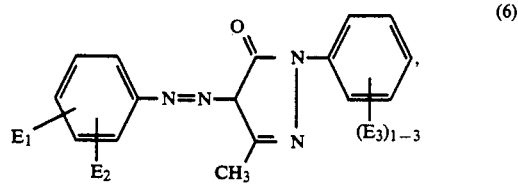

in which $E_1$ is hydrogen or sulfo and $E_2$ is halogen or phenylaminosulfonyl, $(E_3)_{1-3}$ is 1 to 3 substituents $E_3$ and $E_3$ is hydrogen, halogen or sulfo,

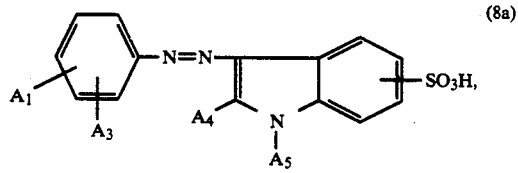

in which $A_1$ is hydrogen, $C_{1-4}$alkyl, $C_{1-4}$alkoxy, $C_{2-4}$alkanoylamino or halogen, $A_3$ is phenylsulfonyl, $A_4$ is $C_1$-$C_4$alkyl or phenyl and $A_5$ is hydrogen or $C_1$-$C_8$alkyl,

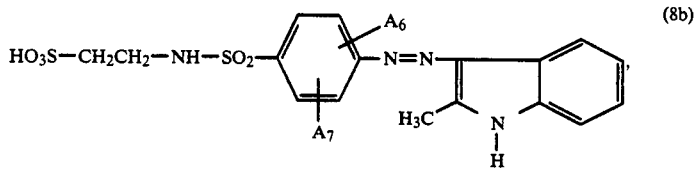

in which $A_6$ and $A_7$ are hydrogen, $C_{1-4}$alkyl, $C_{1-4}$alkoxy, $C_{2-4}$alkanoylamino or halogen,

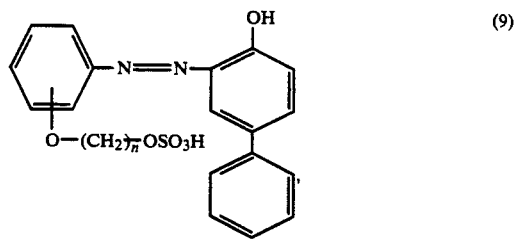

in which n is the number 1 to 3,

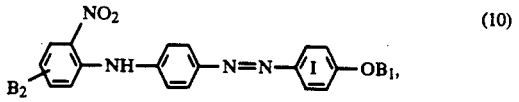

in which $B_1$ is hydrogen or unsubstituted or $C_1$-$C_4$alkyl-, $C_{1-4}$alkoxy- or halogen-substituted phenylsulfonyl, $B_2$ is sulfo or $C_1$-$C_4$alkylsulfonylaminosulfonyl and benzene ring I may be further substituted by $C_1$-$C_4$alkyl, $C_{1-4}$alkoxy or halogen, and

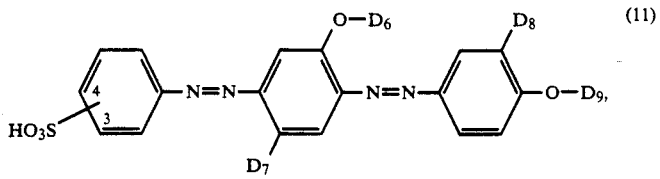

in which D₇ is hydrogen or methyl, D₈ is hydrogen or methyl and D₆ and D₉, independently of one another, are hydrogen, methyl, ethyl, β-hydroxyethyl, β-hydroxypropyl, β-hydroxybutyl or α-ethyl-β-hydroxyethyl, and the sulfo group is bound in the 3 or 4 position.

9. A dye mixture according to claim 1, which comprises a dye of the formula (1) and at least one dye of the formulae

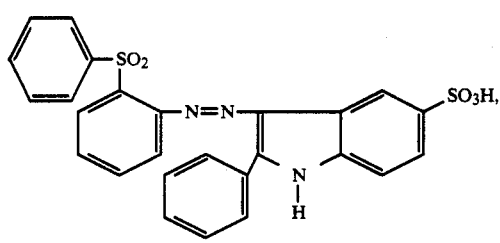

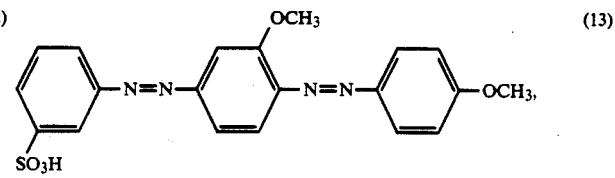

and

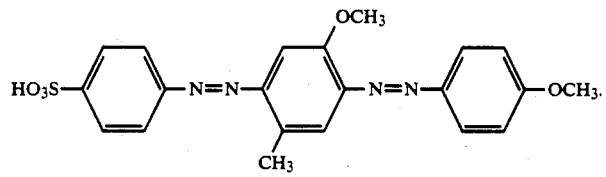

10. A dye mixture according to claim 1, in which the ratio of the dyes of the formula (1) to the dyes of the formulae (2) to (6) is 20:80 to 80:20.

11. A dye mixture according to claim 10, in which the ratio of the dyes of the formula (1) to the dyes of the formulae (2) to (6) is 40:60 to 60:40.

12. A process for the dyeing and printing of natural and synthetic polyamide fibre materials with a dye mixture, wherein a dye mixture according to claim 1 is used.

13. A process for the dyeing and printing of natural and synthetic polyamide fibre materials using a dye mixture according to claim 1 in combination with other dyes.

14. A process according to claim 13 for trichromatic dyeing or printing, wherein a dye mixture according to claim 1 is used in combination with at least one red dye and at least one blue dye.

* * * * *